(12) United States Patent
Emma et al.

(10) Patent No.: US 8,826,095 B2
(45) Date of Patent: *Sep. 2, 2014

(54) METHOD AND SYSTEM FOR PROVIDING AN IMPROVED STORE-IN CACHE

(75) Inventors: Philip George Emma, Danbury, CT (US); Wing K. Luk, Chappaqua, NY (US); Thomas R. Puzak, Ridgefield, CT (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 788 days.

This patent is subject to a terminal disclaimer.

(21) Appl. No.: 13/041,248

(22) Filed: Mar. 4, 2011

(65) Prior Publication Data

US 2011/0161780 A1 Jun. 30, 2011

Related U.S. Application Data (63) Continuation of application No. 11/683,285, filed on Mar. 7, 2007, now Pat. No. 7,941,728.

(51) Int. Cl.
*H03M 13/00* (2006.01)

(52) U.S. Cl.
USPC ............... 714/758; 714/784; 714/807

(58) Field of Classification Search
USPC ............... 714/758, 784, 807, 754
See application file for complete search history.

(56) References Cited

U.S. PATENT DOCUMENTS

| 4,399,506 | A | | 8/1983 | Evans et al. |
| 5,023,776 | A | * | 6/1991 | Gregor ............... 711/122 |
| 5,450,563 | A | | 9/1995 | Gregor |
| 6,038,644 | A | * | 3/2000 | Irie et al. ............ 711/141 |
| 6,122,711 | A | * | 9/2000 | Mackenthun et al. ..... 711/135 |
| 6,161,208 | A | * | 12/2000 | Dutton et al. ........ 714/764 |

* cited by examiner

*Primary Examiner* — Fritz Alphonse
(74) *Attorney, Agent, or Firm* — William Stock, Esq.; McGinn IP Law Group, PLLC (57) ABSTRACT

A hardened store-in cache system includes a store-in cache having lines of a first linesize stored with checkbits, wherein the checkbits include byte-parity bits, and an ancillary store-only cache (ASOC) that holds a copy of most recently stored-to lines of the store-in cache. The ASOC includes fewer lines than the store-in cache, each line of the ASOC having the first linesize stored with the checkbits.

14 Claims, 4 Drawing Sheets

Figure 1

PRIOR ART

Figure 2

PRIOR ART

METHOD AND SYSTEM FOR PROVIDING AN IMPROVED STORE-IN CACHE

RELATED APPLICATIONS

The present application is a Continuation Application of U.S. patent application Ser. No. 11/683,285, filed on Mar. 7, 2007, now U.S. Pat. No. 7,941,728, the entire content of which is incorporated herein by reference.

BACKGROUND OF THE INVENTION

1. Field of the Invention

The present invention generally relates to a method and system for providing an improved store-in cache, and more particularly, to the operation of stores in a cache system and the reliable maintenance of locally modified data in such a cache system.

2. Description of the Conventional Art

Caches are categorized according to many different parameters, each of which has its own implications on performance, power, design complexity, and limitations of use. One of the major parameters used is the Store Policy, which determines how stores to the cache are handled. Such a Store Policy includes two basic approaches, called Store-In and Store-Through.

When storing into a Store-In cache, that is all that one needs to do: store into it. This is exceedingly simple. However, the directory entry for any line that has been stored to must have a status bit (sometimes called a "dirty bit") to indicate that the contents of the line have been changed. When a store has not been percolated into the rest of the cache hierarchy, but has simply been stored into, then the local cache has the most recent, hence the only valid copy of the new data.

This means that if a remote processor attempts to reference this line, it will miss in its local cache, and it must get the only valid copy from the only place that exists—which is the local cache of the processor that last stored into the line. It further means that if a cache selects a line for replacement that has its "dirty bit" set, the modified line cannot simply be overwritten. First, the modified line has to be written back to the next cache level in the hierarchy. This operation is called a "Castout."

Usually, a Castout is done by moving the modified line into a "Castout Buffer," then waiting for the bus (to the next level in the cache hierarchy) to become available (because it should be busy bringing in the new line to replace the Castout), and then moving the line out of the Castout Buffer and over the bus to the next cache level. While a Castout sounds like it is a lot of trouble because it is a new operation that needs to be done, in fact the effect of Castouts is to reduce the overall traffic. This is because most lines that get modified get modified repeatedly. The Castout essentially aggregates these multiple modifications into a single transfer—unlike what occurs in the second approach to the Store Policy, which is a Store-Through approach.

In a Store-Through cache, when data is stored into the local cache, it is also "stored through" the cache, which means that it is stored into the next level of cache too. Thus the total store bandwidth coming out of a Store-Through cache is higher, since every store goes through it. It is noted that a Store-In cache has the effect of aggregating multiple stores made to the same location. It is also noted that, with a Store-Through cache, not only does it have the most recent copy of the stored data, but the next layer of cache in the cache hierarchy has it as well. This means that remote misses can be serviced directly from the next layer of cache in the hierarchy (which may be quicker), and it also means that soft-errors occurring in the lower level of cache are not fatal, since valid data exists in the next level above it.

Conventionally, server processors used for reliable applications all have Store-Through L1 caches, which means that each store made by the processor is done to both its L1 cache and to the next cache level in the hierarchy. This is precisely to protect against soft errors in modified L1 lines, which works because there is a recoverable copy of the data further up in the cache hierarchy.

Of course, having a Store-Through L1 cache would not be a requirement for reliability if Error Correcting Codes (ECC) were used at the L1 level, but this is very difficult to do for the following reason. Many stores in database applications are single byte stores. Maintaining ECC on a byte granularity requires 3 additional bits per byte, which is quite costly.

The alternative to using byte-ECC is to use doubleword (8 byte) ECC, which requires 8 bits per doubleword—the same overhead as byte parity. However, doubleword ECC would require a longer pipeline for byte store instructions, because the ECC would need to be regenerated for the entire doubleword containing the byte. Doing a byte store would no longer simply be a matter of storing a byte. Instead, it first would require reading out the original doubleword, then doing an ECC check to verify that the data in the doubleword is good, then merging the new byte into the doubleword, then regenerating the ECC for the modified doubleword, and finally, storing the new doubleword back. The performance lost to this longer pipeline can be significant.

In some cases, for performance reasons it is more desirable to have the L1 be a Store-In cache. In a Store-In cache, stores do not percolate through the L1 into the rest of the hierarchy, but instead are accumulated in the L1 lines. The only event in which data is written up to the next level in the hierarchy is if a modified line is chosen (by the L1) for replacement, i.e., for a Castout. In this case, the entire line is written out to the next cache level in the hierarchy.

One reason that this is desirable is that the higher levels in the hierarchy are shielded from the raw store bandwidth. Another reason is that certain optimizations can be made in higher levels of the hierarchy if they need only deal with a single store quanta (e.g., just lines as opposed to both lines and doublewords).

In conventional systems and methods, even when a Store-In cache is preferable, such is not an option if reliable operation is a requirement. The present invention overcomes the above problems.

Some conventional Store-In and Store-Through cache implementations are described below.

Figure 1:
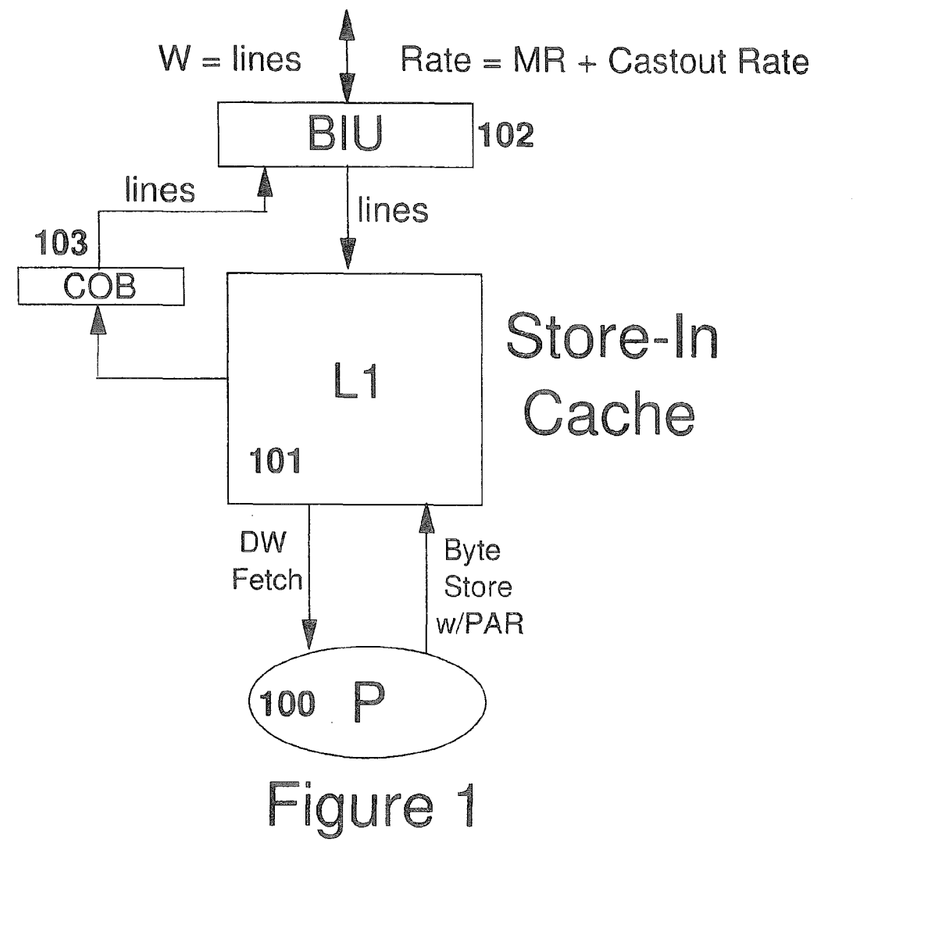
FIG. 1 illustrates a conventional processor with a store-in cache.

FIG. 1 exemplarily shows a processor 100 with an existing-art Store-In cache 101. For the cache to be able to fetch and store data to the next level, the system includes a Bus Interface Unit (BIU) 102. The system also includes a Castout Buffer (COB) 103 for managing Castouts.

In the exemplary arrangement illustrated in FIG. 1, the processor 100 need not be concerned with the machinations of the BIU 102 or the COB 103. Instead, the processor 100 interacts only with the cache 101 itself. When the processor 100 fetches from the cache 101, the processor 100 receives doublewords (with byte parity), but when the processor 101 stores, it can store data (again, with byte parity) on an individual byte granularity.

When there is a cache miss, the cache 101 sends the miss transaction to the Bus Interface Unit (BIU) 102. The "transaction" includes the miss address and the desired state of the miss data (meaning shared or exclusive). The BIU 102 forwards this information to the next cache level in the hierarchy as a "miss request." In the mean time, if the cache selects a line for replacement (by the line that is to be brought in by the miss) that has been modified locally, the modified line needs to be sent to the next cache level to update its copy of the line. To prepare for this, the cache 101 moves the modified line into the Castout Buffer (COB) 103, which notifies the BIU 102 that it has a Castout.

Typically, by the time that the modified line is moved from the cache 101 to the Castout Buffer 103, the BIU 102 will be in the process of handling the incoming line from the miss request, and putting it into the cache 101. Once the incoming line has been completely transferred, the BIU 102 will send the modified line from the Castout Buffer 103 up to the next cache level in the hierarchy (not shown).

Note that the processor 100 interacts with the cache on either a doubleword granularity for fetches, or on a byte granularity for stores.

For purposes of this disclosure, "byte granularity" generally means that the stores can be as small as a single byte, but they can also be multiple bytes, up to a doubleword.

On the other hand, the Bus Interface Unit 102, hence the next cache in the hierarchy (not shown), only works with cache lines, which are typically 128 bytes. That is to say that all transactions to the next cache level in the hierarchy (not shown) are either line fetches or line stores. This means that the next level in the cache hierarchy can be optimized to handle only lines.

The rate of transactions (which are all line transactions) to the next cache level in the hierarchy is the basic L1 miss rate (which are line fetch requests) plus the Castout rate (which are all line store requests). Since only a fraction of the misses will cause Castouts, the Castout rate will be a fraction of the miss rate.

Figure 2:
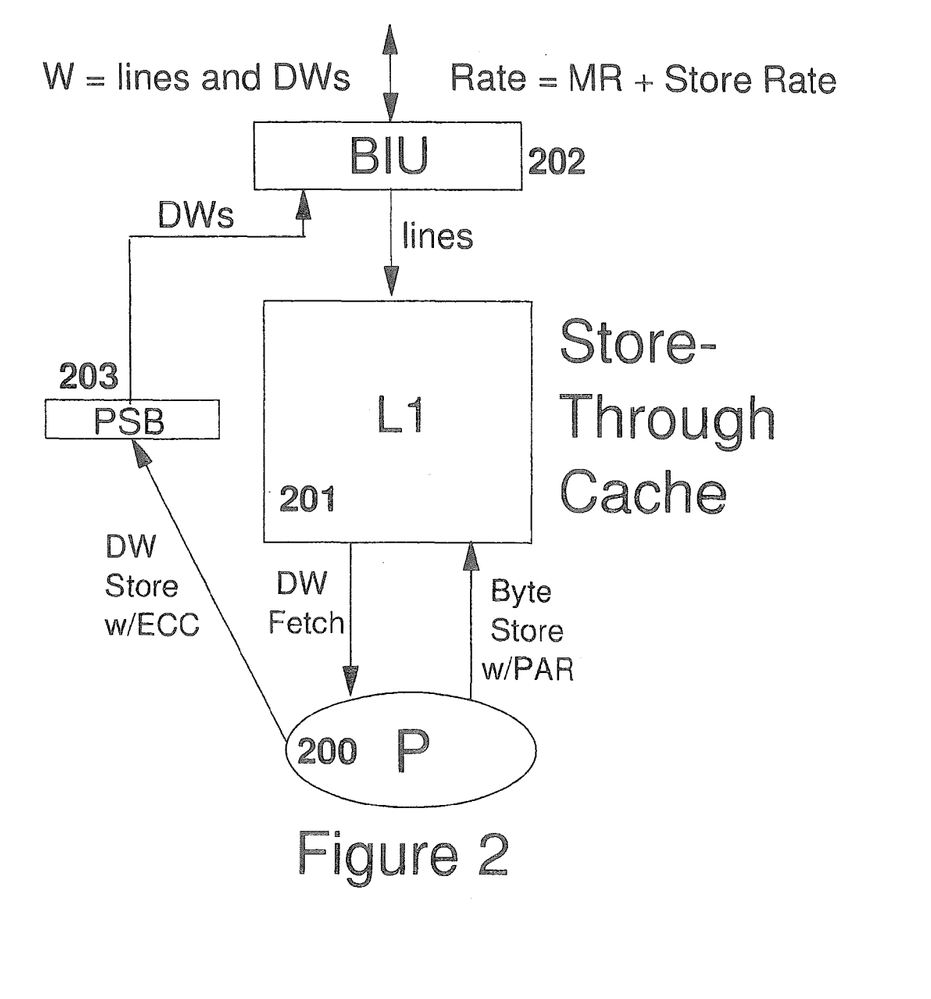
FIG. 2 illustrates a conventional processor with a store-through cache.

FIG. 2 exemplarily shows a similar processor 200 with an existing-art Store-Through cache 201. As before, the processor 200 interacts with the cache 201 by fetching doublewords and storing bytes—all with parity. But since all stores are to be stored-through, all stores done by the processor 200 begin by transferring the doubleword to which the store will be done to the processor during the normal store-pretest. When the processor 200 stores a byte back to the cache 201, it also merges the byte into the prefetched doubleword, and it sends the modified doubleword to a Pending-Store Buffer (PSB) 203.

The PSB 203 deals only in doublewords. Within the PSB, a doubleword Error-Control Code (ECC) is generated for the doubleword sent by the processor (not shown), and the (now protected) doubleword is buffered until the instruction that did the store operation has been completed.

Typically the ECC is a Single Error Correcting, Double Error Detecting (SECDED) code, which does just what it says: if a single bit is flipped, the ECC will be able to determine which bit it was, and it will correct it; if two bits are flipped, the ECC will be able to detect that the data is bad, but it will not be able to correct the data.

When the store instruction is completed, the processor 200 notifies the PSB 203 that the stored data should be sent to the next cache level in the hierarchy (not shown). The PSB 203 sends a doubleword store request to the BIU 202, which will send the modified doubleword up to the next cache level in the hierarchy (not shown).

Meanwhile, as was the case with the Store-In cache of FIG. 1, if a miss occurs in the Store-Through cache 201 of FIG. 2, the miss address and desired state (shared or exclusive) is sent to the BIU 202, which issues the miss request to the next cache level in the hierarchy. Since all stores have already been sent up into the hierarchy, there is no need to cast out any data, ergo, a Castout Buffer is not needed. The BIU 202 merely manages line misses and doubleword stores.

Note that in this case, there are two granularities of data that are used in the next cache level in the hierarchy. For misses, there are line-oriented fetch requests sent to the next level. These requests occur at the L1 cache 201 miss rate. And for every store issued by the processor 200, there is a doubleword store request sent to the next level in the hierarchy. Thus, the next cache level cannot be optimized for a single data granularity, since it must deal both with lines and with doublewords. Further, the next cache level is subjected to the full store-bandwidth of the processor 200.

SUMMARY OF THE INVENTION

In view of the foregoing and other exemplary problems, drawbacks, and disadvantages of the related art methods and structures, an exemplary feature of the present invention is to provide a system, method, and framework for providing an improved store-in cache, and more particularly, to the operation of stores in a cache system and the reliable maintenance of locally modified data in such a cache system.

More particularly, an exemplary feature of the present invention provides a Store-In cache with an additional mechanism, which includes an "Ancillary Store-Only Cache" (ASOC). The ASOC according to the present invention can provide and ensure robust reliability of the system. One skilled in the art would recognize that the ASOC according to the present invention, and how it operates, can include many variations.

An exemplary feature of the present invention provides a method and apparatus for protecting a Store-In cache, which may hold the only valid copy of recently stored data, from soft errors. This allows the use of a Store-In policy when it is desirable for performance reasons, without sacrificing the robust recovery capability that is normally sacrificed when the Store-In policy is used.

Conventionally, server processors used for reliable applications all have store-through caches, which means that each store is done to both the L1 cache and to the next cache level in the hierarchy. This is so that if soft errors occur in modified L1 lines, there is a recoverable copy of the data further up in the hierarchy.

Of course, this would not be necessary if Error Correcting Codes were used at the L1 level, but this is very difficult to do for the following reasons.

Many stores in database applications are single byte stores. Maintaining ECC on a byte granularity requires 3 additional bits per byte, which can be quite costly. An alternative is to use doubleword (8 byte) ECC, which requires 8 bits per doubleword—the same overhead as byte parity. However, doubleword ECC would require a longer pipeline for byte store instructions. Such a store would require reading out the original doubleword, doing an ECC check, merging in the new byte, regenerating the ECC, and storing back the new doubleword. Hence, the performance lost to this longer pipeline can be significant.

In some cases, for performance reasons, it is more desirable to have the L1 be a store-in cache. In a store-in cache, stores do not percolate through the L1 into the rest of the hierarchy, but instead are accumulated in the L1 lines. The only event in which data is written up to the next level in the hierarchy is if a modified line is chosen (by the L1) for replacement. In this case, the entire line is written out to the next cache level in the hierarchy. One reason that this is desirable is that the higher levels in the hierarchy are shielded from the raw store bandwidth. Another reason is that certain optimizations can be made in higher levels of the hierarchy if they need only deal with a single store quanta (e.g., just lines as opposed to both lines and doublewords).

Conventionally, even when a store-in L1 is preferable, it is not an option if reliable operation is a requirement. The present invention provides a system and method that overcomes such problems with the conventional methods and systems.

For example, the exemplary aspects of the present invention can provide a store-in L1 with an additional means, called an "Ancillary Store-Only Cache" (ASOC), which ensures robust reliability of the system. According to the exemplary aspects of the present invention, the ASOC, and how it operates, can include many variations. Several exemplary aspects of the present invention are described below. However, anyone skilled in the art will recognize that the present invention is not limited to the examples provided below.

For purposes of the present invention, the ASOC generally is defined as a small cache (e.g., 8-16 lines) having the same linesize as the L1. The ASOC can be a cache of the most-recently stored-to lines. Lines in the ASOC can be kept with doubleword ECC.

When a line is first stored-to, the line can be fetched from the L1, and copied into the ASOC, while generating doubleword ECC during the transfer. For byte stores, the object doubleword can be read from the L1 during store pretest, and it can be parity-checked. When the store is committed, the new byte can be written into the L1 with its parity. This is the path that the pipeline "sees." What the pipeline does not see is that the byte is then merged into the object doubleword (that was previously fetched), ECC is generated, and the new doubleword is written into the ASOC.

If no parity errors are encountered in the L1, the contents of the ASOC may not be used. However, if there is a parity error, the correct data can be recovered from the ASOC.

When a line ages out of the ASOC, the exemplary aspects of the invention can, for example, do either of two things. First, the exemplary aspects of the invention can write the line out into the hierarchy (and mark it "unmodified" in the L1). Alternatively, the exemplary aspects of the invention can just write the line back into the L1. According to the present invention, the L1 should have the valid data contents, since the present invention would be updating it all along. However, what the line does not have is an ECC—which it needs if it is to remain in the L1 (but not in the ASOC) in a "modified" state. Thus, all that the exemplary aspects of the invention would need to do is to write back the ECC.

The exemplary aspects of the invention take advantage of the fact that doubleword ECC is the same number of bits as byte parity. When the present invention ages a line out of the ASOC, the exemplary aspects of the invention can overwrite the parity bits in the L1 with the corresponding doubleword ECC bits, and set a new state bit to indicate that the check bits for the line are ECC bits, and not parity.

Alternatively, the exemplary aspects of the invention can allocate space in the L1 cache for both ECC and for parity. This is a relatively low cost overhead. The exemplary aspects of the invention also need to indicate whether the ECC bits are valid. For unmodified lines, they will not be. However, according to the exemplary aspects of the invention, once a line has become modified, the ECC bits should be valid.

It is also noted that the exemplary aspects of the invention do not actually need to copy the entire contents of a line from the L1 to the ASOC when the line is first put into the ASOC. Instead, the present invention need only maintain the doublewords that are actually stored to. The exemplary aspects of the invention treat the doublewords in an ASOC line as sectors, and use a "presence" bit for each stored doubleword.

When storing the sector ECCs back to the L1, the exemplary aspects of the invention can indicate (within the L1) which of the sectors (doublewords) have actually been modified, so that it can be known that the checkbits associated with those sectors are actually ECC bits. Alternatively, in a case in which there is room for both, the exemplary aspects of the invention can indicate which ones have actually been set.

If it is desirable to keep both byte-parity and doubleword ECC, but the full overhead of ECC for all doublewords (an additional bit per byte) is undesirable, the exemplary aspects of the invention can instead allocate space for only a subset of the doublewords in a line (e.g., 2, 3, or 4) with an indication of which doublewords these are associated with. In this last exemplary case, lines having more than this many doublewords modified can be castout (to the hierarchy) when this threshold is exceeded.

The practice of these exemplary methods, together with the exemplary apparati described above, enables store-in behavior (as seen by the pipeline and by the rest of the cache hierarchy) while providing the robust protection of a store-through cache.

In one exemplary aspect of the invention, a hardened store-in cache mechanism includes a store-in cache having lines of a first linesize stored with checkbits. The checkbits have byte-parity bits. The hardened store-in cache mechanism also includes an ancillary store-only cache (ASOC) that holds a copy of most recently stored-to lines of the store-in cache. The ancillary store-only cache (ASOC) includes fewer lines than the store-in cache. Each line of the ancillary store-only cache (ASOC) has the first linesize stored with the checkbits, and the checkbits of the ancillary store-only cache (ASOC) are doubleword Error Correcting Code (ECC) for each doubleword within the stored-to lines. The stored-to lines are marked as being modified within the store-in cache when the stored-to lines are stored to using a modified indicator.

In another exemplary aspect of the invention, a hardened store-in cache mechanism includes a store-in cache having lines of a first linesize stored with checkbits, wherein the checkbits include byte-parity bits, and storing means for holding a copy of most recently stored-to lines of the store-in cache, wherein the storing means includes fewer lines than the store-in cache, each line of the storing means having the first linesize stored with the checkbits, the checkbits of the storing means being doubleword Error Correcting Code (ECC) for each doubleword within the stored-to lines, and the stored-to lines being marked as being modified within the store-in cache when the stored-to lines are stored to using a modified indicator.

Another exemplary aspect of the invention is directed to a method of controlling, storing, and recovering data in a store-in cache system having a store-in cache having lines of a first linesize stored with checkbits, wherein the checkbits are byte-parity bits, and an ancillary store-only cache (ASOC) that holds a copy of most recently stored-to lines of the store-in cache, wherein the ancillary store-only cache (ASOC) includes fewer lines than the store-in cache, each line of the ancillary store-only cache (ASOC) having the first linesize stored with the checkbits, the checkbits of the ancillary store-only cache (ASOC) being doubleword Error Correcting Code (ECC) for each doubleword within the stored-to lines, and the stored-to lines being marked as being modified within the store-in cache when the stored-to lines are stored to using a modified indicator. The exemplary method includes storing the most recently stored-to lines of the store-in cache into the ancillary store-only cache (ASOC) with doubleword Error Correcting Codes, reading data stored into the ancillary store-only cache only when the corresponding copy of that data is found to have parity errors in the store-in cache, and using the read data from the ancillary store-only cache to overwrite the data having parity errors in the store-in cache.

BRIEF DESCRIPTION OF THE DRAWINGS

The foregoing and other exemplary purposes, aspects and advantages will be better understood from the following detailed description of an exemplary aspects of the invention with reference to the drawings, in which.

DETAILED DESCRIPTION OF EXEMPLARY ASPECTS OF THE INVENTION

Figure 3:
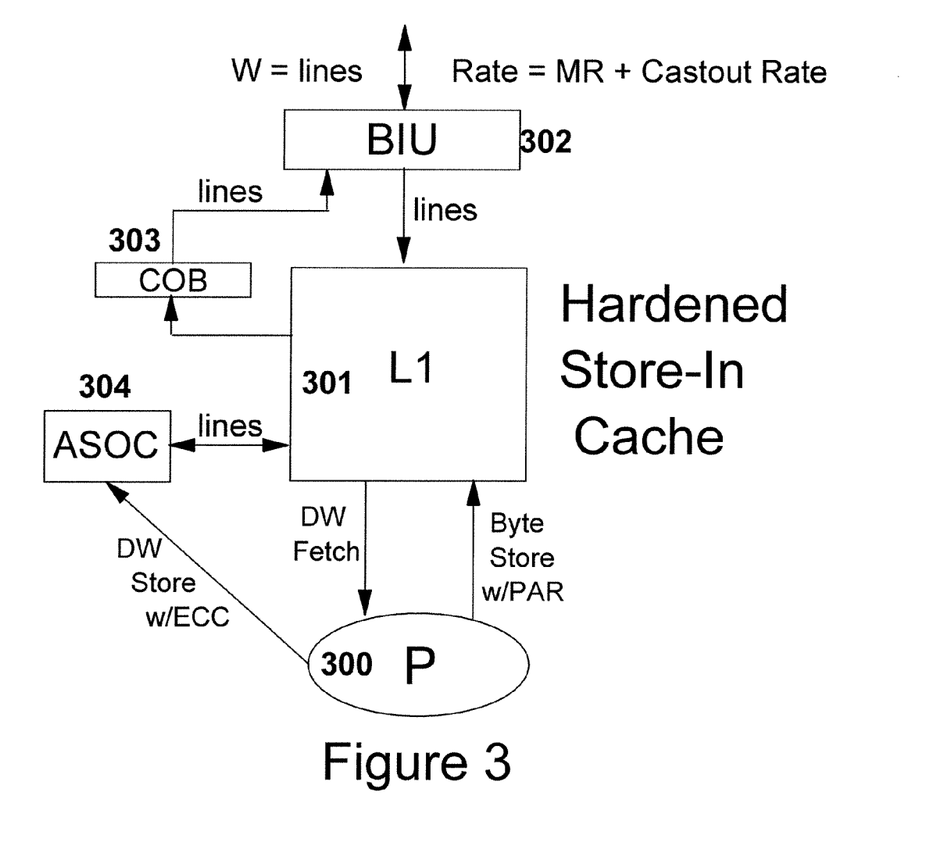
FIG. 3 illustrates an exemplary processor with a store-in cache that is augmented with an ancillary store-only cache, according to an exemplary, non-limiting aspect of the present invention.
Figure 4:
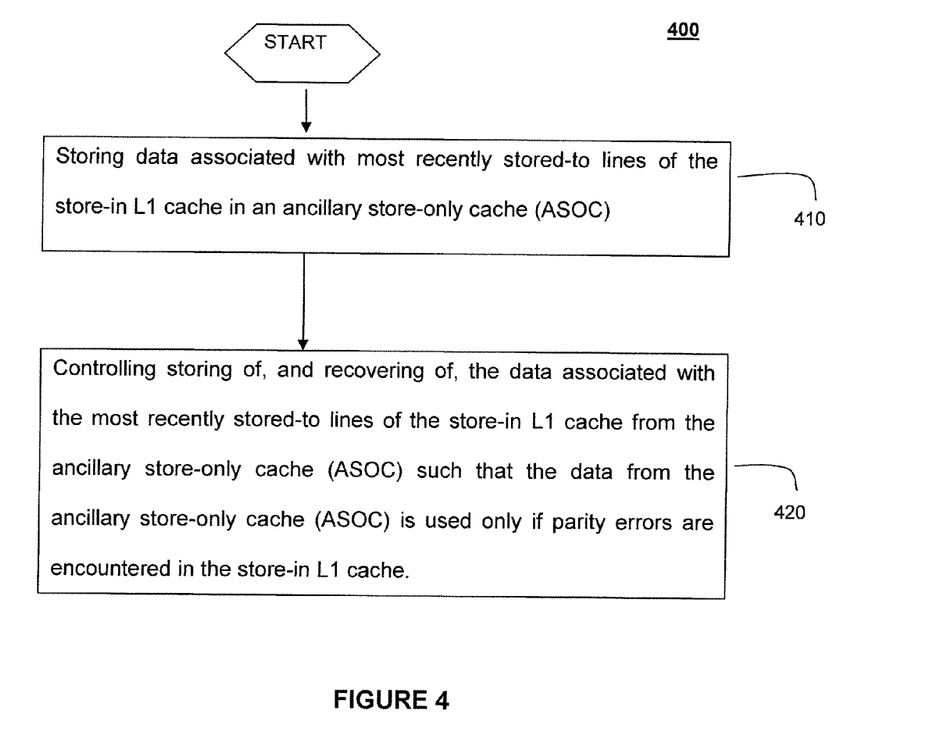
FIG. 4 illustrates an exemplary method, according to an exemplary, non-limiting aspect of the present invention.

Referring now to the drawings, and more particularly to FIGS. 3 and 4, there are shown exemplary aspects of the method and structures according to the present invention.

The present invention relates to a method and system for providing an improved store-in cache, and more particularly, to the operation of stores in a cache system and the reliable maintenance of locally modified data in such a cache system.

FIG. 3 illustrates an exemplary aspect of the present invention. As illustrated in FIG. 3, the exemplary system can include a processor 300 with a Store-In cache 301 that operates similarly to the Store-In cache of FIG. 1, except that FIG. 3 includes an additional mechanism added to the system, which we will call an "Ancillary Store-Only Cache" 304 (ASOC). Component by component, the constituent parts of FIG. 3 are similar to (or the same as) their counterparts in FIG. 1. That is, the processor 300 can be the same as or similar to the processor 100; cache 301 can be the same as or similar to cache 101; Bus Interface Unit (BIU) 302 can be the same as or similar to BIU 102; and Castout Buffer (COB) 303 can be the same as or similar to COB 103. A difference between FIG. 1 and FIG. 3, for example, how each respective system operates, is exemplarily illustrated by the feature of the ASOC 304. Thus, the exemplary aspects of the present invention provide an important advantage of including the ASOC 304, which is not taught or suggested by the conventional systems (e.g., see FIG. 1).

Thus, the ASOC 304 and its basic function provide an important advantage over the conventional systems. Of course, those skilled in the art would recognize that there are many variations on the specifics of how the exemplary ASOC 304 can be used and/or managed. The present invention provides some examples of such below. For example, the basic broad function of the ASOC 304 is explained below.

Fundamentally, the ASOC 304 is another cache that is (logically) operated in parallel with the Store-In cache 301. However, the exemplary ASOC 304 may only hold lines that have been stored into (modified) locally. Further, the ASOC 304 can hold those lines with doubleword ECC, whereas the Store-In cache 301 holds the same lines with byte parity (at least in this first exemplary aspect).

Furthermore, for purposes of this disclosure, the term "doubleword" generally is used as a proxy for any quanta that is larger than a byte but smaller than a cache line. That is, by using the word "doubleword," the present invention is not restricted exclusively to an 8-byte quanta. Instead, such is illustrated for exemplary purposes only. For example, an optimization that happens to be particular to an 8-byte quanta, will be described below.

When a store is issued by the processor 300 in the exemplary "Hardened Store-In Cache" system of FIG. 3, the basic Store-In protocol of FIG. 1 can be followed. That is, a byte (or a plurality of bytes) with byte-parity can be stored directly into the cache 301, and the directory entry for the line that was stored into can be marked appropriately (as being modified locally).

However, at the same time, the line to which the store is issued can be copied into the ASOC 304, and doubleword ECC can be generated for the line in this exemplary process. When the store is first issued, the doubleword into which the byte is stored can be prefetched into the processor 300 just as was done in the case of the Store-Through cache illustrated in FIG. 2. As the processor 300 stores a byte (or multiple bytes) with parity into the cache 301, it also can merge the byte into the prefetched doubleword, and send the doubleword to the ASOC 304, where doubleword ECC is generated, and the doubleword with ECC can be stored into the copy of the line in the ASOC.

In essence, this merging of the new byte into the object doubleword, and generation of doubleword ECC can be similar to the undesirable operation of dealing with doublewords and ECC that was described in the Background section above. For example, in the Background section, it was explained that such was undesirable because it lengthened the pipeline associated with the store operation, which can have a deleterious effect on performance. However, such problems can be avoided or overcome with the ASOC, according to the exemplary aspects of the present invention.

According to the present invention, the ASOC is not part of the processor's store pipeline, hence the merging of bytes and the generation of doubleword ECC have no effect on the performance of the processor's pipeline. The processor pipeline involves only the Store-In cache 301, and is similar to (or the same as) the processor pipeline of FIG. 1. In fact, the contents of ASOC generally are not read, unless there is an error that must be recovered.

Thus, the ASOC is simply a small cache that keeps a copy of all of the locally-modified lines, and it keeps those lines with ECC. This allows the processor to work with the Store-In cache of FIG. 1, while maintaining a backup hardened (meaning "with ECC") copy of modified data, which allows recovery in the event of a soft error.

The exemplary "Hardened Store-In Cache" system of FIG. 3 can afford the two advantages of a Store-In cache (those being that the next level in the cache hierarchy can be optimized for lines only, and that the next level in the cache hierarchy is shielded from the raw store bandwidth of the processor), while providing the error immunity of a Store-Through cache.

Those with ordinarily skill in the art will recognize that variations on the above exemplary aspects of the invention can include any or all variations in how the ASOC is actually managed, and what is actually kept in both the ASOC and the main cache.

Further Exemplary Aspects of the Invention

As mentioned above, for purposes of the present application, the ASOC generally is defined as a small cache (e.g., 8-16 lines) having the same line size as the L1. The ASOC can be a cache of the most-recently stored-to lines. Lines in the ASOC can be kept with doubleword ECC.

When a line is first stored-to, the line is fetched from the L1, and copied into the ASOC, while generating doubleword ECC during the transfer. For byte stores, the object doubleword is read from the L1 during store pretest, and it is parity-checked. When the store is committed, the new byte is written into the L1 with its parity. This is the path that the pipeline "sees." What the pipeline does not see is that the byte is then merged into the object doubleword (that was previously fetched during the store pretest), ECC is generated, and the new doubleword is written into the ASOC.

If no parity errors are encountered in the L1, the contents of the ASOC generally are not used. However, if there is a parity error, the correct data can be recovered from the ASOC.

When a line ages out of the ASOC, the exemplary aspects of the present invention can do either of two things. First, the present invention can write the line out into the hierarchy (and mark it "unmodified" in the L1). Alternatively, the present invention can write the line back into the L1.

Recall that the L1 should have the valid data contents, since the present invention can be updating it all along. However, what the line in the L1 does not have is an ECC, which it needs if it is to remain in the L1 (but not in the ASOC) in a "modified" state. Thus, the present invention merely needs to write back the ECC into the checkbits that had originally held parity.

The present invention takes advantage of the fact that doubleword ECC is the same number of bits as byte parity. When the present invention ages a line out of the ASOC, the present invention can overwrite the parity bits in the L1 with the corresponding doubleword ECC bits, and set a new state bit to indicate that the check bits for the line are ECC bits, and not parity.

Note that, strictly speaking, the present invention does not actually need this new state bit. The ordinarily skilled artisan would recognize that, if the cache were managed in this way, all modified lines in the L1 that are not in the ASOC must have ECC.

Alternatively, the present invention can allocate space in the L1 cache for both ECC bits and for parity bits. This is a relatively low cost overhead. In this exemplary aspect, the present invention also could indicate whether the ECC bits are valid. It is noted that, for unmodified lines, they will not be. However, once a line has become modified, the ECC bits should be valid.

It also is noted that this exemplary aspect of the present invention does not actually need to copy the entire contents of a line from the L1 to the ASOC when the line is first put into the ASOC. Instead, this exemplary aspect of the present invention would only need to maintain the doublewords that are actually stored to. The present invention can treat the doublewords in an ASOC line as sectors, and can use a "presence" bit for each stored doubleword.

When the sector ECCs are stored back to the L1, the exemplary aspect of the present invention can indicate (within the L1) which of the sectors (doublewords) have actually been modified, so that it is known that the check bits associated with those sectors are actually ECC bits. Alternatively, in the exemplary case in which there is room for both, the present invention can provide an indication of which ones have actually been set.

If it is desirable to keep both byte-parity and doubleword ECC, but it is not desirable to have the full overhead of ECC for all doublewords (an additional bit per byte), space can instead be allocated for only a subset of the doublewords in a line (e.g., 2, 3, or 4) with an indication of which doublewords these are associated with. In this last exemplary case, lines including more than this many doublewords modified are Castout (to the hierarchy) when such a threshold is exceeded.

According to the exemplary aspects of the invention, the ASOC need not actually contain the doubleword data. Instead, the exemplary ASOC can simply be a cache that just contains the ECC bits for the modified lines in the L1.

The practice of these exemplary methods, together with the exemplary apparati described above, can enable store-in behavior (as seen by the pipeline and by the rest of the cache hierarchy) while providing the robust protection of a store-through cache.

While the invention has been described in terms of several exemplary aspects, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A hardened store-in cache system, comprising:
   a store-in cache having lines of a first linesize stored with checkbits, wherein said checkbits comprise byte-parity bits; and
   an ancillary store-only cache (ASOC) that holds a copy of most recently stored-to lines of said store-in cache,
   wherein the ASOC includes fewer lines than said store-in cache, each line of the ASOC comprising said first linesize stored with said checkbits.

2. The hardened store-in cache system according to claim 1, wherein said checkbits of said ASOC comprise a doubleword Error Correcting Code (ECC) for each doubleword within said stored-to lines.

3. The hardened store-in cache system according to claim 1, further comprising:
   a cache controller that controls storing of data to the ASOC and recovering of data from the ASOC such that said data from the ASOC is used only if parity errors are encountered in the store-in cache.

4. The hardened store-in cache system according to claim 1, wherein, when lines age out of the ASOC, said lines are written back to another level of cache within a cache hierarchy, with said another level being different from the store-in level, and with a modified indicator corresponding to said written-back lines being reset to indicate non-modification in the store-in cache.

5. The hardened store-in cache system according to claim 1, wherein said lines within the ASOC are partitioned into doubleword sectors, said sectors being used to hold only those doublewords that are actually modified, and further including a presence bit for each said sector, said presence bit indicating whether a corresponding sector has valid contents.

6. The hardened store-in cache system according to claim 1, wherein the state of each line within said store-in cache is augmented to indicate that said checkbits are to be interpreted as at least one of parity and a doubleword Error Correction Code (ECC).

7. The hardened store-in cache system according to claim 6, wherein when lines age out of the ASOC, said aged-out lines are written back into said store-in cache, and wherein ECC bits from the ASOC overwrite said corresponding parity bits within said store-in cache, said augmented state in said store-in cache being set to indicate that newly written checkbits are the ECC bits.

8. The hardened store-in cache system according to claim 7, wherein said store-in cache includes both parity bits and said ECC bits, and
   wherein less than all of the ECC bits are valid.

9. The hardened store-in cache system according to claim 7, wherein said store-in cache includes only a subset of the ECC bits,
 wherein said store-in cache includes a field to indicate which doubleword sectors are protected in each line, and
 wherein said store-in cache includes a policy of casting out lines when a threshold number of modified doublewords is exceeded.

10. The hardened store-in cache system of claim 1, wherein said ancillary store-only cache includes said checkbit information, and is devoid of said data.

11. A hardened store-in cache system, comprising:
 a store-in cache having lines of a first linesize stored with checkbits, wherein said checkbits comprise byte-parity bits; and
 a memory device for holding a copy of most recently stored-to lines of said store-in cache,
 wherein said memory device includes fewer lines than said store-in cache, each line of said memory device having said first linesize stored with said checkbits, said stored-to lines being marked as being modified within said store-in cache when said stored-to lines are stored to using a modified indicator.

12. The hardened store-in cache system according to claim 11, further comprising:
 a cache controller that controls storing of data to said memory device and recovers data from said memory device such that said data from said memory device is used only if parity errors are encountered in the store-in cache.

13. A hardened store-in cache apparatus, comprising:
 a store-in cache having lines of a first linesize stored with checkbits, wherein said checkbits comprise byte-parity bits; and
 an ancillary store-only cache (ASOC) that holds a copy of most recently stored-to lines of said store-in cache,
 wherein the ASOC includes fewer lines than said store-in cache, each line of the ASOC having said first linesize stored with said checkbits, and said stored-to lines being marked as being modified within said store-in cache when said stored-to lines are stored to use a modified indicator.

14. The hardened store-in cache apparatus according to claim 13, wherein said checkbits of the ASOC comprise a doubleword Error Correcting Code (ECC).

* * * * *